H. V. DURYEA.
Starch Rake.
No. 12,846.
Patented May 8, 1855.
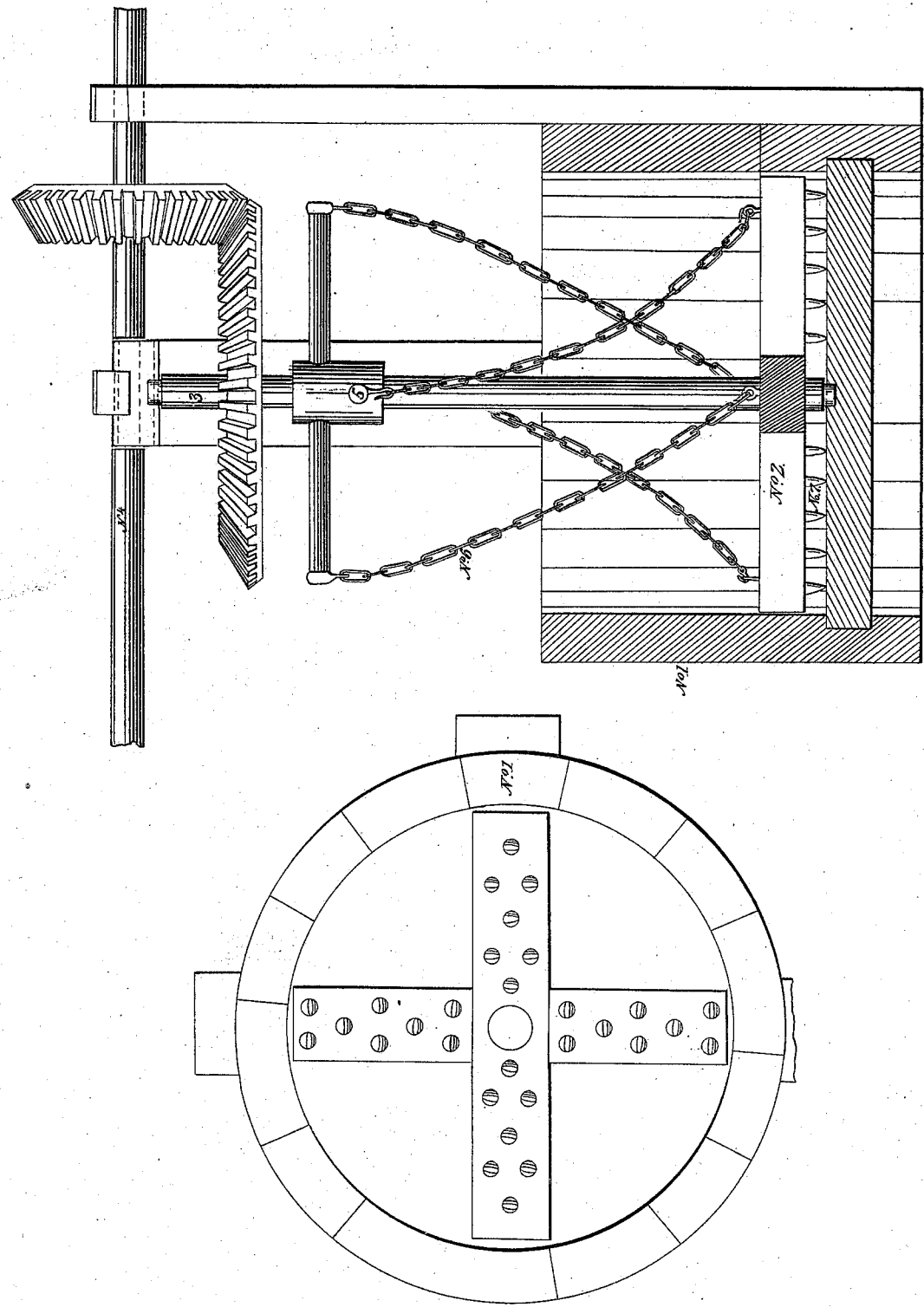

UNITED STATES PATENT OFFICE.

HENDRICK V. DURYEA, OF OSWEGO, NEW YORK, ASSIGNOR TO OSWEGO RIVER STARCH COMPANY.

IMPROVEMENT IN APPARATUS FOR MANUFACTURING STARCH.

Specification forming part of Letters Patent No. 12,846, dated May 8, 1855.

*To all whom it may concern:*

Be it known that I, HENDRICK V. DURYEA, of the city of Oswego, in the county of Oswego and State of New York, have invented a new and useful Machine for Digging and Cutting up Deposits of Starch while Undergoing the Several Processes in its Manufacture; and I do hereby declare that the following is a full, clear, and exact description of the construction and operation of the same, reference being had to the annexed drawings, making a part of this specification, and to which several parts reference is made by figures, viz:

No. 1 designates a circular tub or cistern to receive the starch in solution. From this tub or cistern the water is discharged after depositing at the bottom the starch it held in solution.

No. 2 designates the starch-rake, movable up and down on an upright shaft, with teeth on the lower side, and attached by chains No. 6 to the arms No. 5, springing from the upright shaft, and when in motion revolves, cutting or digging the starch to fragments, causing it readily in this state, by a gentle application of water, to be redissolved, so that by a pump, spout, or otherwise it can be transferred to other depositories.

The object of suspending the rake aforesaid on chains is that as the rake is movable up and down on an upright shaft, the chains No. 6 sustain the rake and may be lengthened or shortened, so that when in operation the rake will be made to rise or fall and thus accommodate itself to a greater or less quantity of starch contained in the tub or cistern.

No. 3 is the upright shaft, set in motion by (No. 4) horizontal shaft and carrying or driving the rake No. 2.

No. 4 is the horizontal shaft, armed with bevel cog-wheels, and driving the upright shaft No. 3.

No. 5 designates four arms passing out from the upright shaft at right angles, for the purpose of attaching chains or rods.

No. 6 designates the chains connecting the arms with the rake.

No. 7 designates the rake-teeth, for tearing, cutting, and digging up the starch which collects at the bottom of the tub or cistern, the said teeth being affixed to or inserted in two, four, or more arms attached to the lower part of the upright shaft No. 3.

In the manufacture of starch, the starch while it is held in solution by water is drawn into tubs or vats and then allowed to settle. After the water is drawn off the starch becomes very compact and hard, and it requires great labor by hand to remove the same from such tub or vat. By allowing a small quantity of water to run upon the compact mass, and by the use of my starch-rake, which I have before described, the starch is easily cut up and may be removed by a pump or otherwise to other depositories, thus proving great saving in manual labor.

What I claim as my invention, and desire to secure by Letters Patent, is—

The construction and adaptation of the rake 2, furnished with teeth 7, and hung on chains 6, for digging, cutting up, and loosening starch deposits.

HENDRICK V. DURYEA.

Witnesses:
J. ESMOND,
S. CROMBIE.